July 11, 1933.  S. O. JAKOBSEN  1,917,373
SPRING FOR CARS
Filed May 22, 1931  3 Sheets-Sheet 1
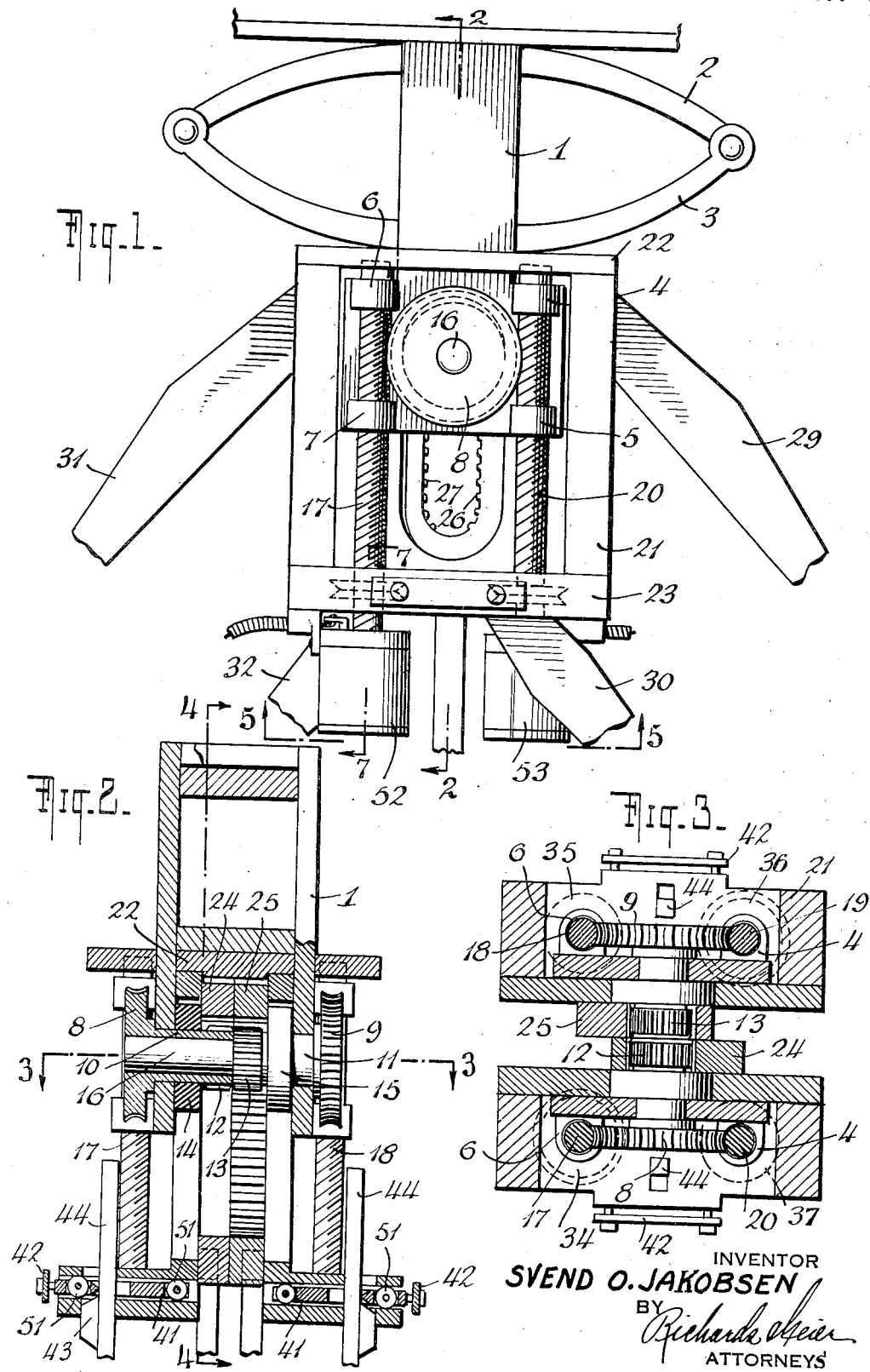
INVENTOR
SVEND O. JAKOBSEN
BY
Richards Geier
ATTORNEYS

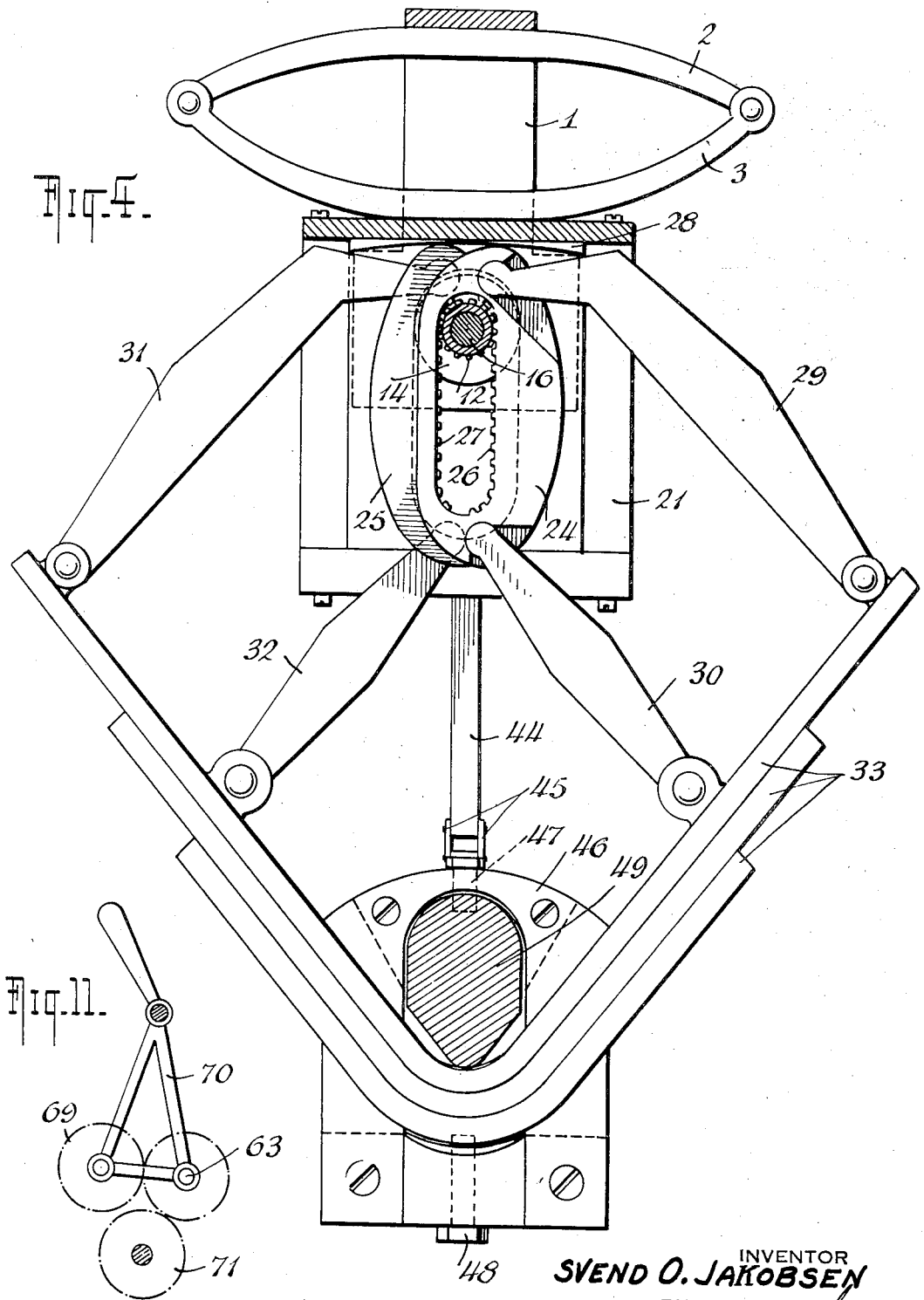

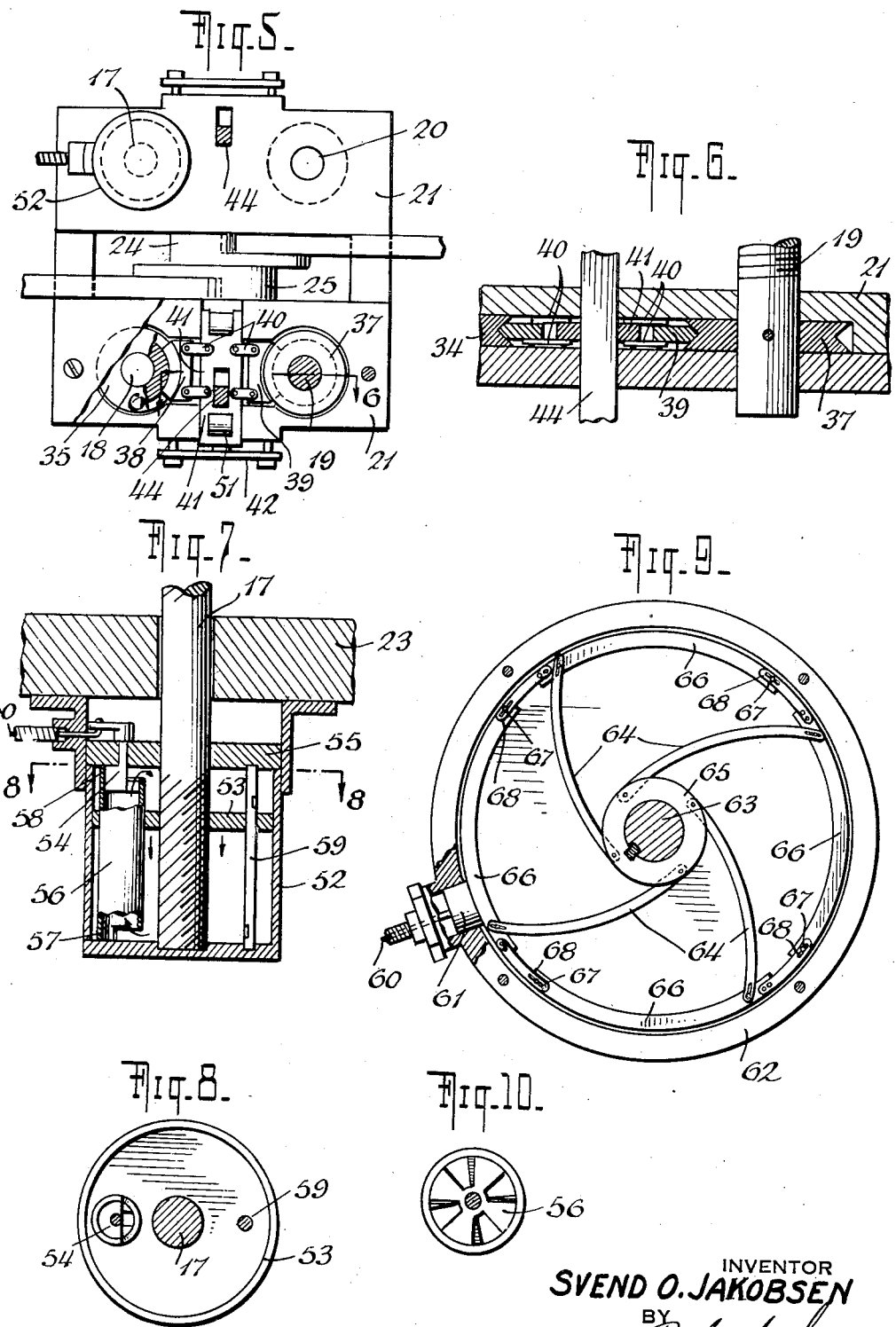

Patented July 11, 1933

1,917,373

UNITED STATES PATENT OFFICE

SVEND OLDER JAKOBSEN, OF HOIEVARDE NEAR HAUGESUND, NORWAY

SPRING FOR CARS

Application filed May 22, 1931. Serial No. 539,183.

This invention relates to improvements in springs for cars and other vehicles.

An object of this invention is to provide a device having a plurality of spring-acting members of different dimensions, wherein members having a greater length and a smaller cross-section are adapted to support the weight of the vehicle at a certain load and wherein after an increase of said load other members having a smaller length and a greater cross-section automatically replace the first-mentioned members, thereby adapting the spring mechanism to the variations of the load.

A further object of this invention is to provide brake mechanisms operating at a certain predetermined load and also at a certain predetermined velocity of the vehicle for the purpose of stopping and releasing the action of the above-mentioned spring device and thereby eliminating excessive stresses liable to injure the device.

According to this invention, the body of the car is supported by a frame provided with a plurality of toothed wheels meshing with worm gears connected by means of a system of bars and springs with the axle of the car. Owing to the rotation of the worm gear and the toothed wheels, said frame is adapted to move up and down in accordance with whether the car load is diminishing or increasing. This movement is regulated by means of two brakes acting upon said worm gear, one of these brakes being a mechanical one, whereas liquid means are used for the second brake. The mechanical brake, which usually remains in action, is adapted to release the downward or the upward movement of the frame at a certain position of the latter, corresponding to a certain predetermined load on the frame. The second brake, which operates quite independently from this mechanical brake, is regulated by the speed of the vehicle which influences the diameter of a centrifugal expansible ring adapted to act upon a device by means of which the rotation of the above-mentioned worm gear is either arrested or released.

The above-mentioned system of bars and springs comprises a plurality of bars having different dimensions and adapted to support in turns the main load of the car according to the varying position of the movable frame.

The invention will appear more clearly from the following detailed description, when taken in connection with the accompanying drawings, which illustrate a preferred embodiment of the inventive idea.

In the drawings:

Fig. 1 shows a spring device according to this invention in side elevation with some parts broken off.

Fig. 2 is a vertical cross-section along the lines 2—2 of Fig. 1 looking in the direction of the arrows.

Fig. 3 is a horizontal cross-section along the lines 3—3 of Fig. 2 looking in the direction of the arrows.

Fig. 4 is a vertical cross-section along the lines 4—4 of Fig. 2 looking in the direction of the arrows and shows the attachment of the bars and the mechanical brake to the axle of the car.

Fig. 5 is a horizontal section along the lines 5—5 of Fig. 1 looking in the direction of the arrows with parts of the carrying frame plate broken off.

Fig. 6 is a vertical section along the lines 6—6 of Fig. 5 on a larger scale.

Fig. 7 is a vertical section along the lines 7—7 of Fig. 1 on a larger scale and shows a liquid brake mechanism used in connection with the spring device.

Fig. 8 is a horizontal cross-section along the lines 8—8 of Fig. 7 looking in the direction of the arrows.

Fig. 9 shows a device operating by means of the centrifugal force the liquid brake mechanism.

Fig. 10 is a top view on a larger scale of a modified form of a cylindrical valve used in connection with the liquid brake mechanism.

Fig. 11 shows diagrammatically a swinging frame used in connection with the centrifugal device.

In the drawings, 1 is a main frame adapted to carry the body of the car and attached to it by any known means. A pair of springs 2 and 3 extend through this frame and are used as a brake during the vertical reciprocating movement of said frame 1 connected with plates 4, 5, 6 and 7 forming a continuation of said frame. Gear wheels 8 and 9 are rotatably mounted in said frame and are provided with extensions 10 and 11 rigidly connected with toothed wheels 12 and 13 respectively and carrying rollers 14 and 15, which can freely rotate on them. A shaft 16 extends across the frame 1 and is freely mounted within the extensions 10 and 11 so that the wheel 8 may be rotated in a direction opposite to that of the wheel 9. Rods 17, 18, 19 and 20 provided with helical teeth extend freely through openings in plates 4, 5, 6 and 7 and form together with the gear wheels 8 and 9 worm gears, so that a rotary motion of said gear wheels is transmitted to the rods 17, 18, 19 and 20. As shown in the drawings, the gear wheel 8 meshes with both the rods 17 and 20, whereas the wheel 9 meshes with the rods 18 and 19. Frame 1, connected with the plates 4, 5, 6 and 7 and together with the shaft 16 and the parts connected therewith is moved downwards when the weight of car increases sufficiently to compress the springs 2 and 3.

A frame 21 is connected with plates 22 and 23 and in normal position is carried by two oval guides 24 and 25 arranged side by side, as shown in Fig. 2. In the modification shown in the drawings, the guide 24 has the form of an oval ring and is provided with interior teeth 26 on one side of its interior surface, said teeth meshing with the wheel 13. The guide 25 is provided with interior teeth 27 on the opposite side of its interior surface, and these teeth mesh with this wheel 12 (Figs. 1, 2 and 4). Obviously this arrangement may be changed according to circumstances. An abutment 28 is connected with the plate 22 and has a circular shape, the radius of the circle being equal to or greater than the distance between the plate 22 and the lowest teeth of the set of teeth 26 (Fig. 4). Bars 29 and 30 are connected with the guide 24, whereas similar bars 31 and 32 are connected with the guide 25. Opposite ends of the bars 29, 30, 31 and 32 are connected with springs 33 formed of a plurality of bent steel bars connected with each other by any desirable means.

The rods 17, 18, 19 and 20 carry on their lower ends discs 34, 35, 36 and 37, respectively, rigidly connected with said rods and having V-shaped side surfaces. Discs 35 and 37 are adapted to be locked in position by means of a brake mechanism situated in the lower part of the frame 21 and comprising brakes 38 and 39 connected with links 40 pivoted on a plate 41 provided with an opening situated in the middle of this plate (Fig. 5). A steel plate 42 is attached by screws to the frame 21 and is used as a spring for the purpose of holding in position an abutment 43 on a rod 44, connected by means of links 45 with a casing 46 (Figs. 2 and 4). Rollers 50 and 51 are mounted in the plate 41 and facilitate the movements of said plate. Screws 47 and 48 are used to prevent the casing 46 from sliding on the axle 49 of the car.

The brake mechanism operates as follows:
When the rod 44 is in normal position, the abutment 43 presses the plate 41 against the spring 42 thereby moving the brakes 38 and 39 away from the discs 35 and 37 and releasing said discs. Upon movement of the abutment upwardly or downwardly the spring 42 will press the plate 41 back in its previous position, the links 40 pressing the brakes 38 and 39 against the discs 35 and 37 and stopping the rotation of said discs. A similar brake is used for discs 34 and 36 and is not shown in detail in the drawings.

To prevent a rapid reciprocating movement of the movable parts a second brake mechanism is employed wherein liquid means are used which are adapted to be brought automatically into action by the centrifugal force of a rotating axle during the movement of the car. Said brake comprises a casing 52 attached to the frame 21. In Fig. 1 the casing 52 is shown as being attached to the lower portion of the frame 21; it can, however, be situated on the upper portion of that frame or in any other convenient place. The casing 52 has preferably a cylindrical shape, and encloses the lower end of the rod 17.

A similar casing 53 is situated diametrically opposite the first one and encloses the lower end of the rod 19.

A piston 53 (Fig. 7) is mounted on the rod 17 and is adapted to slide up and down within the casing 52 when the rod 17 is rotated. A member 54 having the shape of a half cylinder is situated on the cover 55 of the casing 52 and projects into a hollow cylinder 56 provided with projections 57 and 58, as seen in Fig. 7. When the piston 53 moves downward oil is usually able to pass into the upper part of the casing 52. When, however, the member 54 is swung around, the opening of the cylinder 56 is closed and oil is prevented from circulating. Then any further movement of the piston 53 is prevented and consequently any further rotation of the rod 17. Another narrow and hollow cylinder 59 is provided within the casing 52 for the purpose of allowing some of the liquid to penetrate into the upper part of the casing in cases when a sudden load is placed upon the spring 2.

According to this arrangement the member 54 has to be rotated for 180° before closing the inlet of the liquid. It is however possible to provide the cylinder 56 with a plurality of openings, which will be covered when the member 54 is moved only a few degrees. The principle of this modification is shown in Fig. 10.

As has been mentioned already, the liquid brake shown in detail in Fig. 7 is actuated by means of a wire 60, the movements of said wire being transmitted to the member 54 and being used to arrest and to release the liquid brake. The wire 60 is automatically actuated by means of a mechanism shown in Figure 9 and consisting of a number of members 66 which are rotated by a shaft 63 of the vehicle; these members 66 are adapted to change their positions under the influence of the centrifugal force created through the rotation of the shaft 63, and this radial movement of the members 66 is transmitted to the wire 60 and is used to actuate said wire and, consequently, to operate the liquid brake shown in Figure 7.

The member 54 is connected with a wire 60, the other side of which is attached to a piston 61 arranged within a casing 62 (Fig. 9). A shaft 63 extends through the casing 62 and is connected with a plurality of wide shovels 64 by means of a ring 65. The outer ends of said shovels 64 are connected with links 66 which are inter-connected by means of pins 67 sliding within grooves 68 so that the diameter of the ring formed by said links can be made larger or smaller. It is to be noted, however, that the links 66 should not come into contact with the casing 62.

The centrifugal force occasioned by the initial movement of the shaft 63 will expand the ring formed by the links 66, which will then push forward the piston 61 and consequently the wire 60, thereby closing the member 54. When the rotation of the shaft 63 is sufficiently great, the current of air created by the shovels 64 will suffice to move the piston 61.

The shaft 63 must be brought into action just before the car begins to move, to prevent the bumps due to start, but should not rotate when the car stands still.

It is important that the shaft 63 should always rotate in the same direction. For that purpose an auxiliary shaft 69 (Fig. 11) may be provided, which can drive the shaft 63 by friction. A swinging frame 70 may also be provided by means of which a main shaft 71 of the motor may be brought into contact either with the shaft 63 or with the shaft 69. If the main driving shaft 71 is rotated in a direction opposite to the direction in which the shaft 63 is to be rotated, the shaft 71 can be brought directly in contact with the shaft 63 and will then rotate the shaft 63 in the proper direction by friction. If, however, the shaft 71 rotates in the same direction in which the shaft 63 should be rotated, the rotation of the shaft 71 is first transmitted to an auxiliary shaft 69. The shaft 69 is placed in contact with both the shafts 71 and 63 by means of the swinging frame 70 and rotates the shaft 63 by friction in the proper direction.

I claim:

1. Springs for cars and other vehicles comprising in combination a frame, a plurality of toothed wheels connected with said frame, rods provided with helical teeth meshing with some of said toothed wheels, means for stopping and releasing the rotation of said rods at a certain predetermined position of said frame and means for stopping and releasing the rotation of said rods at a certain predetermined speed of the vehicle.

2. Springs for cars and other vehicles comprising in combination, a movable frame, a plurality of toothed wheels rotatably mounted in said frame, guides provided with teeth meshing with some of said toothed wheels, a plurality of bars and springs connected with said guides, rods provided with helical teeth meshing with others of said toothed wheels, means for stopping and releasing the rotation of said rods at a certain predetermined position of said frame and means for stopping and releasing the rotation of said rods at a certain predetermined speed of the vehicle.

3. Springs for cars and other vehicles comprising in combination, a movable frame, a plurality of toothed wheels rotatably mounted in said frame, guides provided with teeth meshing with some of said toothed wheels, a plurality of bars having different dimensions and connected with said guides, springs connected with said bars, a casing surrounding an axle of the vehicle and carrying said springs, a second frame, rods provided with helical teeth meshing with others of said toothed wheels and carried by the second-mentioned frame, means for stopping and releasing the rotation of said rods at a certain predetermined position of said frame and means for stopping and releasing the rotation of said rods at a certain predetermined speed of the vehicle.

In testimony whereof I have affixed my signature.

SVEND OLDER JAKOBSEN.